United States Patent [19]

Glück et al.

[11] Patent Number: 4,930,792
[45] Date of Patent: Jun. 5, 1990

[54] SEALING ARRANGEMENT FOR AN ENGINE TIMING HOUSING COVER

[75] Inventors: Roland Glück, Ludwigsburg; Otto Heilemann, Wernau; Rolf Klingmann, Plüderhausen, all of Fed. Rep. of Germany

[73] Assignee: Daimler-Benz AG, Stuttgart, Fed. Rep. of Germany

[21] Appl. No.: 276,535

[22] Filed: Nov. 28, 1988

[30] Foreign Application Priority Data

Nov. 26, 1987 [DE] Fed. Rep. of Germany ....... 3740033

[51] Int. Cl.⁵ .............................................. F16J 15/12
[52] U.S. Cl. ............................ 277/235 B; 277/207 R; 277/235 R
[58] Field of Search ............ 277/207 R, 235 B, 235 R

[56] References Cited

U.S. PATENT DOCUMENTS

| | | | |
|---|---|---|---|
| 3,664,676 | 5/1972 | Petersen | 277/235 B |
| 4,103,913 | 8/1978 | McDowell | 277/235 B |
| 4,300,779 | 11/1981 | DeCove et al. | 277/235 B |
| 4,312,512 | 1/1982 | Conte et al. | 277/235 B |
| 4,535,996 | 8/1985 | Cardis et al. | 277/235 B |
| 4,535,999 | 8/1985 | Locacius | 277/235 B |
| 4,620,710 | 11/1986 | Lambert et al. | 277/235 B |
| 4,676,514 | 6/1985 | Beutter et al. | 277/235 B |

FOREIGN PATENT DOCUMENTS

| | | |
|---|---|---|
| 2634328 | 3/1977 | Fed. Rep. of Germany . |
| 3001730 | 7/1980 | Fed. Rep. of Germany . |
| 3409054 | 1/1985 | Fed. Rep. of Germany . |

*Primary Examiner*—Allan N. Shoap
*Assistant Examiner*—Jeffrey J. Hohenshell
*Attorney, Agent, or Firm*—Evenson, Wands, Edwards, Lenahan & McKeown

[57] ABSTRACT

The invention relates to an arrangement for sealing a stationary timing housing cover at the end face of an internal-combustion engine housing comprising cylinder head and crankcase. The timing housing cover is composed of a cylinder head side and a crankcase side cover part, between which an elastomer profile seal element is retained under compressive stress. The seal element exhibits a sealing lug oriented at right angles to the separating line to seal the end face contact surface of the internal-combustion engine housing in the plane of the separating line running between cylinder head and crankcase in the region of the adjacent edges of cylinder head, crankcase, cylinder head gasket located between the two latter, and the cover parts. The cylinder head gasket is provided with a flowable sealing medium applied bead-fashion on its end edge which faces the timing housing cover.

4 Claims, 2 Drawing Sheets

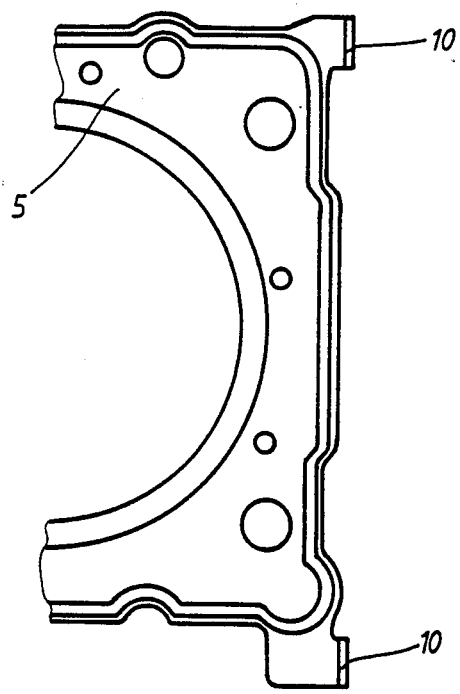
Fig. 2
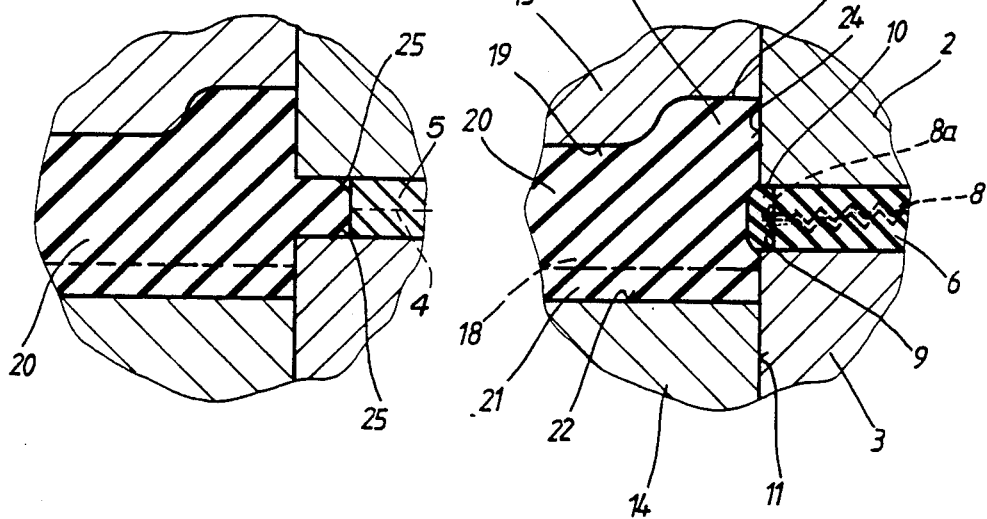
Fig. 4 PRIOR ART
Fig. 3

SEALING ARRANGEMENT FOR AN ENGINE TIMING HOUSING COVER

BACKGROUND AND SUMMARY OF THE INVENTION

The invention relates to an arrangement for sealing a stationary timing housing cover at the end face of an internal-combustion engine housing comprising cylinder head and crankcase.

A sealing arrangement of this type is known from German Patent No. (DE) 3,409,054 C 1, in which sealing problems are unavoidable due to the numerous tolerances between cylinder head, crankcase and cover parts. The elastomer profile seal element with its sealing lug, which is fitted under pretension to the end face of the internal-combustion engine housing and preferably to the end edge of the cylinder head gasket, is incapable, due to its comparative rigidity, of compensating tolerances or of filling gaps in the separating line completely. This then results in oil leakage.

It is therefore an object of the invention to make an arrangement for sealing a stationary multi-part timing housing cover which ensures a durable sealing of the internal-combustion engine in the separating line in the critical sealing region between the cover parts of the timing housing cover, the cylinder head and the crankcase.

This object is achieved according to the invention by providing an arrangement wherein metal support plate parts project at the end face of a metal-plate-reinforced cylinder head gasket facing the timing housing cover, over which a flowable sealing medium of beadlike construction is applied and projects over the end face of the internal-combustion engine housing and is pressable into the separating line by the elastomer profile seal element under pretension.

By the measures according to the invention the end edge of the cylinder head gasket is provided with a flowable compound which flows so perfectly into the separating line during the assembly of the crankcase side cover part and of the cylinder head side cover part by the elastomer profile seal element under pretension that reliable sealing is achieved durably in the separating line irrespectively of unavoidable production tolerances.

Other objects, advantages and novel features of the present invention will become apparent from the following detailed description of the invention when considered in conjunction with the accompanying drawings.

BRIEF DESCRIPTION OF THE DRAWINGS

FIG. 2 shows in plan view a cylinder head gasket with flowable sealing medium applied to the end edge in accordance with the preferred embodiments of FIG. 1.

FIG. 3 shows on a much larger scale the cylinder head gasket of FIG. 2 with the sealing medium compressed by an elastomer profile seal element; and FIG. 4 shows a known construction in which the elastomer profile seal element has been forced into the separating line as far as the cylinder head gasket.

DETAILED DESCRIPTION OF THE DRAWINGS

Figure 1:
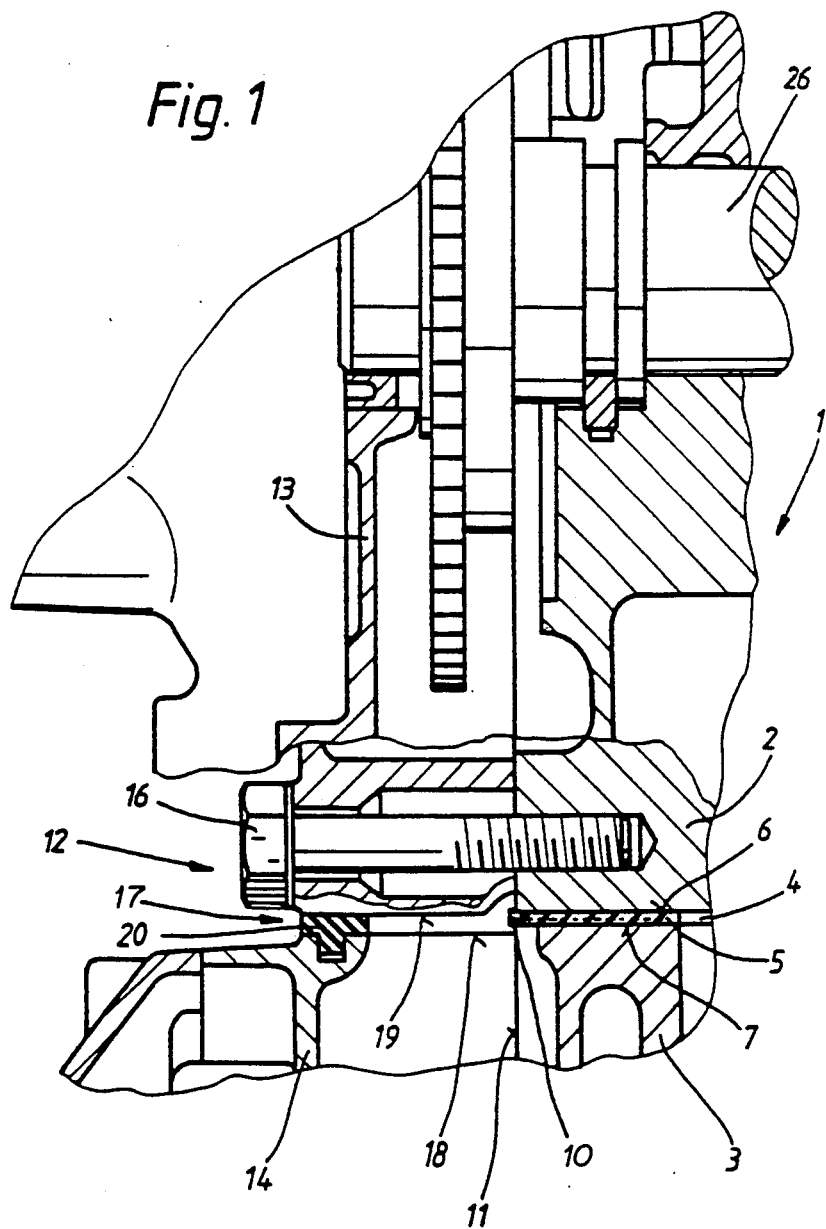
FIG. 1 is a schematic part sectional view which shows a sealing of the two cover parts of a timing housing cover at the end face of an internal-combustion engine housing, constructed in accordance with a preferred embodiment of the invention.

The internal-combustion engine housing 1, shown only partly in FIG. 1, comprises a cylinder head 2 and a crank case 3, into the separating line 4 of which a metal-reinforced cylinder head gasket 5 has been inserted between a sealing surface 6 on the cylinder head 2 and a sealing surface 7 on the crankcase 3.

The cylinder head gasket 5 exhibits metal support plates 8 for reinforcement, from which metal support plate parts 8a project out of the end edge 9 of the cylinder head gasket 5 and act as a support for a flowable sealing medium 10 applied bead-fashion to the end edge 9 (FIGS. 2 and 3). The sealing medium 10 forms a prolongation of the cylinder head gasket 5 which extends along the total length of the crankcase 3 and the cylinder head 2 and projects partly out of the separating line 4 irrespectively of existing production tolerances (FIG. 3).

A two-part timing housing cover 12, which is fastened to the end face 11 of the internal-combustion engine housing 1, comprises a cylinder head side cover part 13, and a crankcase side cover part 14. The cover part 14 is fastened only to the crankcase 3, and the cover part 13 only to the cylinder head 2, by means of screws 16 extending in the axial direction, the two cover parts 13, 14 being fixed precisely in position on the internal-combustion engine housing 1 by means of dowel pins, not shown.

The separating line 17 which exists between the cover parts 13, 14 is located in the plane of the separating line 4 and is formed by a plane sealing surface 18 on the crankcase side cover part 14 and a plane sealing surface 19 on the cylinder head side cover part 13. An elastomer profile seal element 20 is present between the separating line 17, and its securing strip 21, which is rectangular on the underside, is inserted into a corresponding receiving groove 22 within the sealing surface 18 of the crankcase side cover part 14.

The profile seal element 20 is provided with sealing lug 22A which projects upwards oppositely to the securing strip 21. Corresponding reliefs 23 are constructed in the region of the sealing surface 19 on the cylinder head side cover part 13 to house this sealing lug 22A. During the assembly of the cover part 13 the sealing lugs 22A are pressed against the rubber resilient compound 10 and against the sealing surface 24 of the internal-combustion engine housing 1. Reliable sealing of the edges of the cylinder head 2 and of the crankcase 3 which converge in the region of the sealing lugs 22A, and of the separating line 4 and of the sealing surfaces 18, 19 of the superposed cover parts 13, 14, is achieved without forming cavities.

Due to the special sealing arrangement the cylinder head side cover part 13 can be fastened to the cylinder head 2 in the longitudinal direction of the camshaft 26.

FIG. 4 shows the sealing arrangement known from DE 34 09 054 C 1, in which cavities 25, which result in leakage, exist in the separating line 4 betweeen cylinder head gasket 5 and profile seal element 20.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for sealing a stationary timing housing cover at the end face of an internal-combustion engine housing, wherein said engine housing comprises a cylinder head and a crankcase, said timing housing cover comprising a cylinder head side cover part and a crankcase side cover part, mutually adjacent sides of the cylinder head side cover part and the crankcase side cover part are constructed as a sealing surface, between which an elastomer profile seal element is retained under compressive stress, a downward projecting securing strip of the profile seal element is inserted into a corresponding receiving groove within the sealing surface of the crankcase side cover part, and an upward projecting sealing lug of the profile seal is located in a correspondingly constructed relief in the cylinder head side cover part, an end face of the elastomer profile seal element masks with its sealing lug an end face contact surface of the internal-combustion engine housing in the region of adjacent edges of the cylinder head and the crankcase, in a substantially rectangular separating space between the cylinder head and crankcase, a metal plate reinforced cylinder head gasket is provided within said separating space, wherein metal support plate parts project laterally at an end face of the metal-plate-reinforced cylinder head gasket facing the timing housing cover, over which a flowable sealing medium of beadlike construction is applied and projects over an end face of the internal-combustion engine housing and is pressable into the separating space by the elastomer profile seal element under pretension.

2. Arrangement according to claim 1, wherein the metal support plate parts are a support for the flowable sealing medium, which is curable to form a resilient compound.

3. Arrangement according to claim 1 wherein the flowable sealing medium consists of silicones.

4. Arrangement according to claim 2, wherein the flowable sealing medium consists of silicones.

* * * * *